Figure 1:
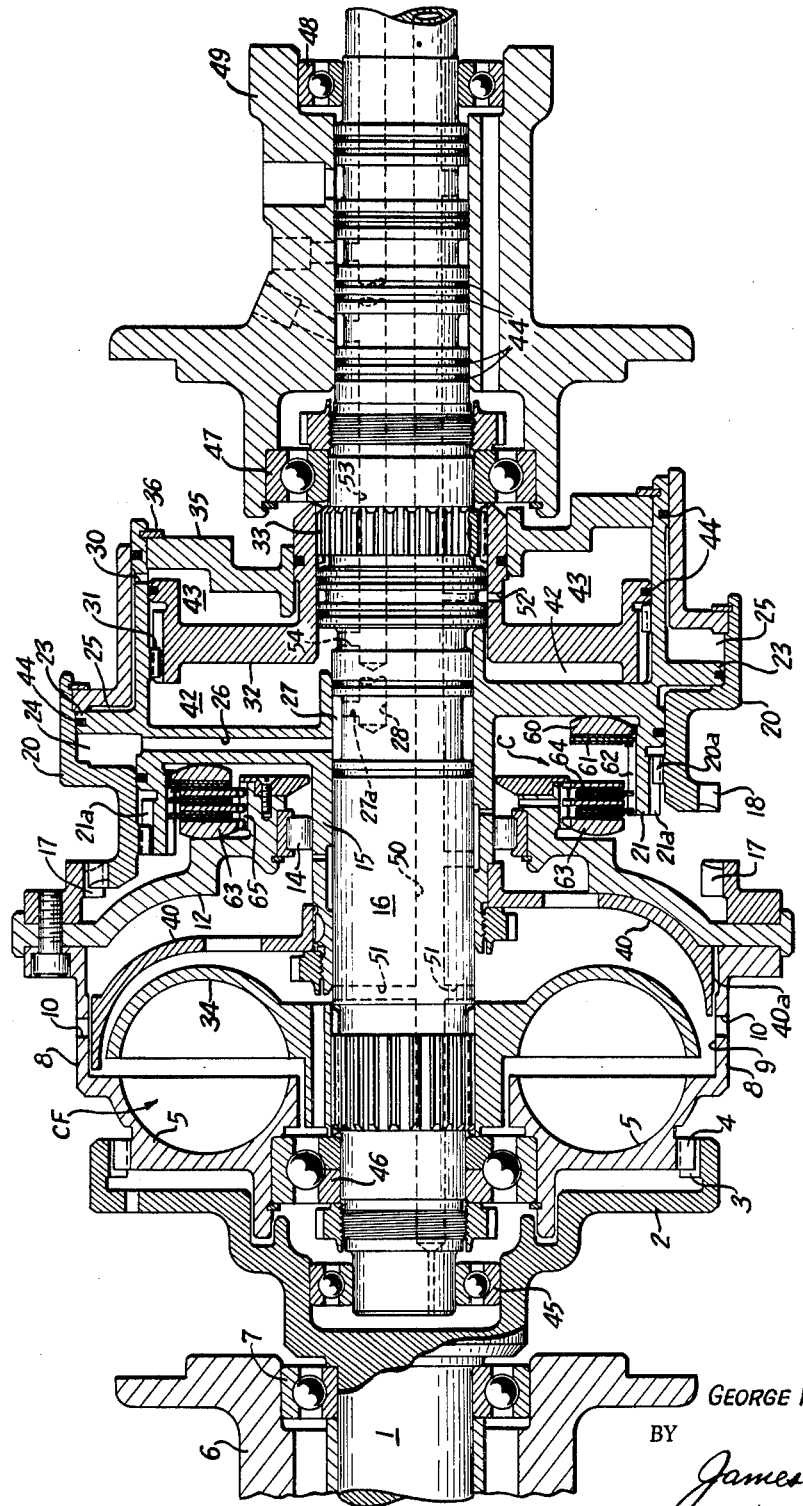

April 26, 1966 G. R. ASCHAUER 3,247,936
FLUID COUPLING WITH DUMP VALVE
Filed March 5, 1964 2 Sheets-Sheet 1

INVENTOR.
GEORGE R. ASCHAUER
BY
James E. Nilles
ATTORNEY

INVENTOR.
GEORGE R. ASCHAUER

United States Patent Office 3,247,936
Patented Apr. 26, 1966

3,247,936
FLUID COUPLING WITH DUMP VALVE
George R. Aschauer, Racine, Wis., assignor to Twin Disc
  Clutch Company, Racine, Wis., a corporation of Wisconsin
Filed Mar. 5, 1964, Ser. No. 349,688
7 Claims. (Cl. 192—3.2)

The present invention relates to fluid couplings of the type having driven and driving units including an impeller and turbine which together form a chamber for the fluid of the coupling.

One of the problems in couplings of this nature has been the time necessary to unload or dump the fluid from such a coupling. Various methods have been used for this purpose, such as for example, the so-called "scoop tube" method, the bleeding coupling method, or the displacement of the fluid by centrifugal force and its reintroduction by air pressure. These devices have not been entirely satisfactory because, among other things, they did not operate fast enough, or were too complicated and costly to manufacture and maintain in proper working condition.

One aspect of the present invention provides a hydraulic coupling having a fluid dumping valve which is effectively sealed during the period of speed synchronization of the parts, but which can immediately dump fluid from the coupling when desired. The valve of the present invention is formed by parts of the driven and driving units, and relative rotation between them occurs until they lock up. The arrangement is such that the oil leakage past the closed valve is minimized because of relative rotation between the parts of the valve and the consequent long path which the fluid must take to reach the discharge passage of the valve. It is necessary to maintain this sealing function for a few seconds and until the speed of the driven unit of the coupling has been synchronized with the drive unit.

It has also heretofore been proposed to use a friction clutch in combination with a fluid coupling, and which clutch controls the magnitude of clutch slip and/or frictionally locks the coupling elements together. These devices have not proven to be entirely satisfactory because, among other reasons, of the heat developed in the coupling, the power loss and the lack of ability to transmit heavy loads.

Accordingly, the present invention also provides a fluid coupling having a mechanical lock-up between the driven and driving parts, and which eliminates slippage and heat build-up and results in greater efficiency of the coupling. A more limited aspect of the invention contemplates a friction clutch for substantially synchronizing the speed of the driven and driving parts prior to such a mechanical lock-up.

Thus the invention provides a flexible and versatile arrangement of a clutch capable of a modulating action or operation and which clutch is combined with a fluid coupling which accommodates excessive heat. Stated otherwise, there is provided a fluid coupling and clutch combination for an accelerating device or for continuous slip, i.e., a modulated clutch coupling; this is accomplished by providing a coupling of relatively high slip when it drives a propeller type load alone, and during modulation to a no-slip condition the heat generated is accommodated by the coupling and the clutch.

With the above arrangement, a fluid coupling has been provided with a function similar to a clutch in that it can fill and dump the fluid almost instantaneously. The dump valve provided by the present invention provides an effective means for preventing fluid loss before the coupling is locked up, thereby minimizing power loss.

Figure 2:
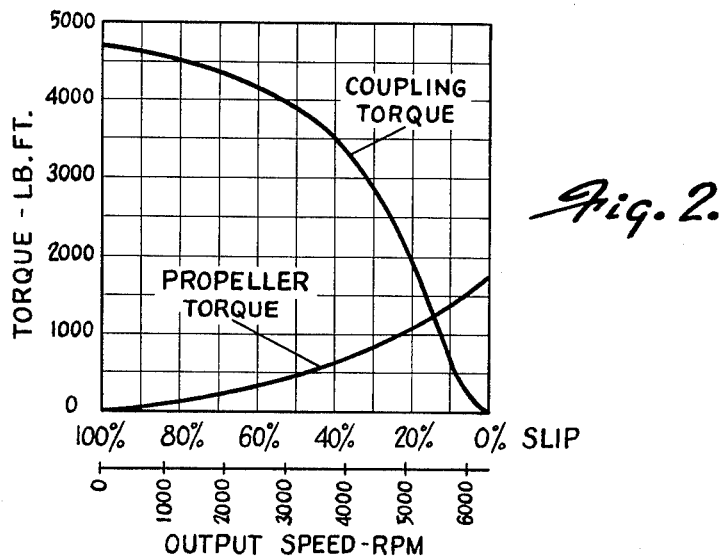
Figure 3:
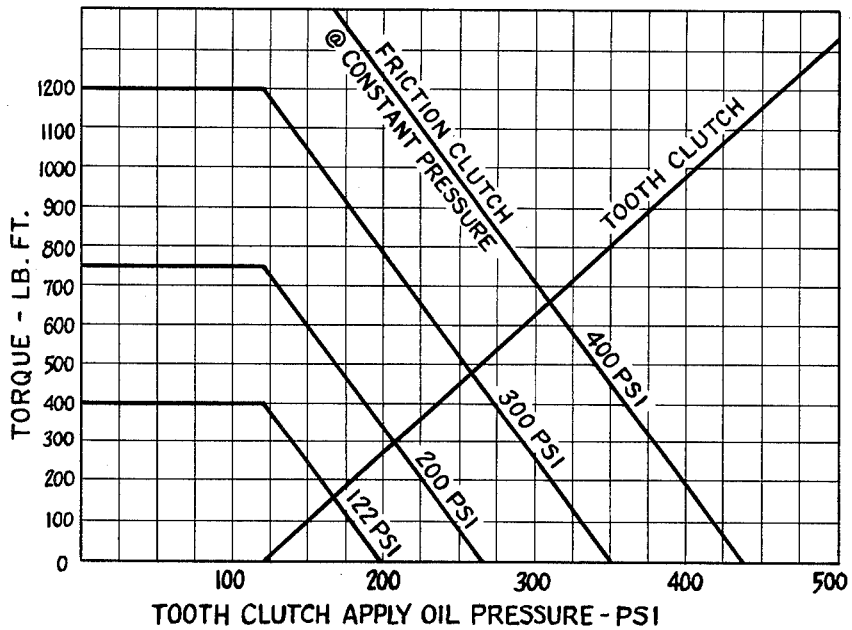

These and other objects and advantages of the present invention will appear as the disclosure progresses, reference being had to the accompanying drawings in which:

FIGURE 1 is a longitudinal sectional view through a fluid coupling embodying the present invention, some of the parts which are located below the centerline being moved to a different position from the corresponding parts above the centerline, and showing some parts as being broken away for clarity;

FIGURE 2 is a graph showing the curves of the propeller and coupling torques and their points of intersection or slip points, as an example of a coupling made in accordance with the present invention; and FIGURE 3 is a graph of the tooth clutch and the friction clutch torques for a device made in accordance with the present invention, and illustrating the points of intersection of these curves at which lock-up occurs for various fluid pressures.

*Driving unit*

Referring in greater detail to the drawing, the driving unit includes a shaft 1 which receives the power from a power source such as a gas turbine (not shown) or the like. The enlarged, cup-shaped end 2 of this shaft has an internal gear 3 which is in driving mesh with the external gear 4 of the impeller 5. The driving unit is suitably supported by being journalled in the support frame 6 on anti-friction bearings 7.

The impeller has a cylindrical, sleeve-like portion 8 which in turn has a cylindrical internal surface or bore 9. A pair of fluid discharge passages 10 extend from bore 9 and through portion 8.

The driving unit also includes an inner wall 12 having a set of annular, internal gear teeth 17. This wall is supported at its inner end on the anti-friction roller bearing assembly 14 carried on a sleeve portion 15.

The driving unit comprises shaft 1, impeller 5, portion 8 and wall 12.

*Driven unit*

Portion 15 is free to slide axially, within limits, on a driven shaft 16 of the driven unit to be described.

An axially shiftable lock-up member 20 has a set of teeth 18 which are selectively engageable with teeth 17. This member 20 has a spline 20a which forms a sliding spline connection with spline 21a of a cylindrical portion 21 of the driven unit. A piston portion 23 of portion 15 forms a pair of expansible fluid chambers 24 and 25 with member 20 for axially shifting the latter. In this manner member 20 forms a detachable and mechanical lock-up connection between the driven and driving units, that is to say, the teeth 17 and 18 form axially interengageable means between the driven and driving units. When chamber 24 is pressurized with fluid via port 26 in portion 15, annular groove 27, port 27a and rifle drilling 28, the member 20 is urged to the left, as viewed in FIGURE 1, thereby causing engagement of teeth 17 and 18 and consequent mechanical lock-up as will appear. When chamber 25 is pressurized with fluid via port 30, as will appear, then member 20 is forced to the right (FIGURE 1) and teeth 17 and 18 are disengaged.

Portion 15 is slidably splined at 31 to a member 32. Member 32 is axially and rotationally fixed to shaft 16 by a spline connection 33. A turbine 34 is formed as a part of member 32 and this turbine together with the impeller 5 forms a chamber CF for the working fluid of the coupling.

An end member 35 is fixed by a snap ring 36 to portion 15 and can slide axially with portion 15 relative to member 32 and shaft 16.

The driven unit can be considered as the portion 15, driven shaft 16, member 32, lock-up member 20 and a sealing member 40.

The axial location of sealing member 40 and its associated portion 15 is determined by fluid pressure in either expansible chamber 42 or 43 which are formed between the driven parts 15 and 32, and as will appear more fully later. The member 40 has a cylindrical peripheral surface 40a which forms a sliding seal with the internal cylindrical surface 9, and thereby the axially shiftable member 40 together with passages 10 provide a fluid dumping valve.

It will be noted that member 40 rotates relative to the surface 9 until the speed of the units of the clutch are synchronized.

Suitable and conventional seals 44 are provided between the various parts to prevent fluid leakage between.

The driven shaft 16 is suitably piloted in anti-friction bearing 45 in the enlarged end of shaft 1, and impeller 5 is suitably journalled on bearing assembly 46 on shaft 16. The other end of shaft 16 is supported by bearing assemblies 47 and 48 in the support frame 49.

Suitable rifle drilling in shaft 16 forms a fluid passageway 50 for the admission of fluid into the coupling via cross ports 51, and into the declutching chamber 43 via port 52—this fluid also enters the lock-up release chamber 25 via port 30. Rifle drilling 53 furnishes pressure fluid via port 54 to the clutch actuating chamber 42.

Pressure fluid is furnished by a conventional fluid pump (not shown) or the like through suitable conduits (not shown) to the rifle drilling 28, 50 and 53.

*Friction clutch*

Friction clutch means C are provided between the wall 12 of the driving unit and the portion 15 of the driven unit. A pressure plate 60 and friction plate 61 are carried on a spline 62 of the driven unit, and a pressure plate 63 and friction plates 64 are similarly mounted on spline 65 on the driving unit.

The clutch is engaged when fluid is admitted to chamber 42 which causes portion 15 to move to the left (FIGURE 1), thus compressing the clutch pack. The engagement of the clutch causes the driven unit to be brought up to the speed of the driving unit. The amount of slip in the clutch can be determined by the amount of fluid pressure admitted to chamber 42. In this manner the speed of operation of the clutch can be varied and its operation modulated as desired.

Along with the movement of portion 15 in the clutch engaged direction, the shiftable valve element or sealing member 40 also moves to close the valve passage 10. The timing is such that discharge passages 10 are closed just prior to the engagement of the friction clutch.

Low pressure fluid is admitted to chamber 43 to declutch the coupling. This pressure fluid then also expands chamber 25 and causes disengagement of the mechanical lock-up teeth 17 and 18.

*Operation*

Assume low pressure fluid had previously been introduced into chamber 43 to cause retraction (movement to the right in FIGURE 1) of the portion 15 including the valve sealing member 40 and lock-up member 20. The fluid has been dumped in about one second from the coupling via the two discharge passages 10.

Assume that the driving unit is rotating and it is desired to transmit power to the driven shaft 16. Fluid pressure, for example on the order of 100 p.s.i., is admitted through passageway 50, thus charging the fluid coupling chamber formed by the impeller and the turbine via ports 51, and also charging the declutch chamber 43. The same fluid pressure is simultaneously introduced from passageway 53 via port 54 into the clutch actuating chamber 42. It will be noted that the effective cross sectional area of chamber 42 is greater than that of chamber 43 and consequently portion 15 is moved toward the left, that is, into the clutch engaged position. Just prior to the clutch thus being engaged, the sealing member 40 has moved to cover the discharge passages 10, thus permitting the coupling chamber to fill with working fluid.

Due to the relative rotation between the cylindrical portion 8 containing passages 10 and the sliding valve element or sealing member 40, it is difficult for the fluid in the coupling to leak between these relatively moving parts and out passages 10. This is due to the fact that the fluid does not move simply in an axial direction between these parts and out passages 10, but instead the fluid must make many revolutions around member 40 and between it and surface 9, before it reaches passage 10. In other words, the oil must follow a long and tortuous flow path, due to the difference in rotational speeds which at the beginning may be as great as 6000 r.p.m. This effective sealing function need last only a few seconds until the speed of the driven unit is brought up to substantial synchronization with the driving unit. At that time fluid pressure is admitted from passageway 28, port 27a, groove 27, port 26 and into the mechanical lock-up actuating chamber 24. Pressure fluid acting in chamber 24 and against piston 23 relieves the clamping action of the friction clutch, permitting the clutch to slip, and consequently permitting axial engagement of teeth 17 and 18. The reaction of forcing the teeth 17 and 18 together acts to relieve the clamping action and torque of the friction clutch. The coupling is then mechanically locked together, thereby eliminating slippage of the coupling and consequent heat build-up and power loss.

With the above arrangement, one element of the valve runs with the input and the other runs with the output, and as a result the discharge valve of the coupling is comprised of relatively rotating parts until the speeds are synchronized.

An effective seal is thus provided for the short period of time during which it is necessary, resulting in a saving of power and an efficient "dump and fill" coupling.

In addition, the present invention also provides a combined modulated clutch and fluid coupling in which the heat generated can be accommodated in the fluid of the coupling and which coupling is flexible and versatile in its operating characteristics.

A fluid coupling and clutch is provided for an accelerating or a continuous slip device, a modulated clutch coupling. FIGURE 3 shows the torque curves for one design made in accordance with the present invention, it being recognized that these curves could be altered by design so as to intersect at any desired slip point. The coupling is designed with relatively high slip when it drives a propeller type load alone, the heat generated by modulation to "no slip" then being shared by the friction clutch as well as the fluid coupling.

Furthermore, this fluid coupling goes into mechanical lock-up just prior to transmitting the full load and the coupling oil pressure can then go into pressure decay.

FIGURE 3 shows how the friction clutch torque capacity falls as the tooth clutch torque rises, and the points at which these torque curves intersect at which point mechanical lock-up of the device occurs. These points represent various constant friction clutch apply pressures.

Various modes of carrying out the invention are contemplated as being within the scope of the following claims particularly pointing out and distinctly claiming the subject matter which is regarded as the invention.

I claim:
1. A hydraulic coupling comprising relatively rotatable driven and driving units, said driven unit including a turbine and said driving unit including an impeller which provides a chamber therebetween adapted to contain the working fluid of the coupling, a fluid dumping valve in said coupling and adjacent the periphery of said chamber for rapidly dumping fluid from said chamber; said valve comprising an outlet passage in said driving unit and in fluid receiving communication with said chamber, and a sealing member carried by said driven unit for rotation therewith but separate from said turbine for axial sliding relative thereto, said member opening and closing said passage by relative axial movement;

and means for causing axial movement of said sealing member.

2. A hydraulic coupling comprising relatively rotatable driven and driving units, said driven unit including a turbine and said driving unit including an impeller which provides a chamber therebetween adapted to contain the working fluid of the coupling, said driving unit having a cylindrical bore, a fluid dumping valve in said coupling and adjacent the periphery of said chamber for rapidly dumping fluid from said chamber; said valve comprising an outlet passage through said bore of said driving unit and in fluid receiving communication with said chamber, and a sealing member axially slidable on said driven member and in respect to said turbine and fixed to said driven member for rotation therewith, said sealing member having a cylindrical peripheral surface which slides in sealing relationship with said bore and over said passage to thereby open and close said passage, and means for causing axial movement of said sealing member.

3. A hydraulic coupling comprising relatively rotatable driven and driving units, said driven unit including a turbine and said driving unit including an impeller which provides a chamber therebetween adapted to contain the working fluid of the coupling, a fluid dumping valve in said coupling and adjacent the periphery of said chamber for rapidly dumping fluid from said chamber, said valve including a sealing member which is axially shiftable independently of said impeller and turbine, friction clutch means on said units for bringing the driven unit up to the approximate speed of the driving unit, fluid operated means on said driven unit and connected to said sealing member for closing said dumping valve and causing actuation of said friction clutch means, axially interengageable means carried by said units for mechanical lock-up of said units after the speeds of said units have been substantially synchronized, and fluid operated means for shifting said interengageable means.

4. A coupling as defined in claim 1 including, interengageable means carried by said units for mechanical lock-up of said units.

5. A coupling as defined in claim 4 including means between said units for synchronizing their rotational speeds.

6. A coupling as defined in claim 2 including, interengageable means carried by said units for mechanical lock-up of said units.

7. A coupling as defined in claim 6 including means between said units for synchronizing their rotational speeds.

References Cited by the Examiner
UNITED STATES PATENTS

| | | | |
|---|---|---|---|
| 2,024,842 | 12/1935 | Bauer et al. | |
| 2,130,895 | 9/1938 | Ness | 192—3.2 |
| 2,320,116 | 5/1943 | Avila | 192—3.2 |
| 2,731,119 | 1/1956 | Burdett et al. | 192—3.2 |
| 3,163,269 | 12/1964 | Kugel | 192—3.2 |

FOREIGN PATENTS 565,122  10/1958  Canada.

DAVID J. WILLIAMOWSKY, *Primary Examiner.*

DON A. WAITE, *Examiner.*

B. W. WYCHE, *Assistant Examiner.*